United States Patent
Kamen et al.

(10) Patent No.: US 7,273,116 B2
(45) Date of Patent: *Sep. 25, 2007

(54) DYNAMIC BALANCING VEHICLE WITH A SEAT

(75) Inventors: Dean Kamen, Bedford, NH (US); Robert R. Ambrogi, Manchester, NH (US); Robert J. Duggan, Strafford, NH (US); J. Douglas Field, Bedford, NH (US); Richard Kurt Heinzmann, Francestown, NH (US); William Lambrechts, Manchester, NH (US); Matt McCambridge, Bow, NH (US); Christopher Perry, Manchester, NH (US); Mark E. Tellam, Orlando, FL (US)

(73) Assignee: DEKA Products Limited Partnership, Manchester, NH (US)

( * ) Notice: Subject to any disclaimer, the term of this patent is extended or adjusted under 35 U.S.C. 154(b) by 67 days.

This patent is subject to a terminal disclaimer.

(21) Appl. No.: 11/296,878

(22) Filed: Dec. 8, 2005

(65) Prior Publication Data

US 2006/0086544 A1   Apr. 27, 2006

Related U.S. Application Data

(60) Division of application No. 10/436,889, filed on May 13, 2003, now Pat. No. 7,004,271, which is a continuation-in-part of application No. 09/386,686, filed on Aug. 31, 1999, now Pat. No. 6,561,294.

(51) Int. Cl.
*B62D 61/00* (2006.01)

(52) U.S. Cl. .......................... 180/21; 180/7.1; 180/8.2

(58) Field of Classification Search ............... 280/205, 280/5.28, 5.38, 208, 209, 218, 229; 180/21, 180/8.2, 65.5, 907, 5.26, 218, 7.1; 297/195.1, 297/215.15

See application file for complete search history.

(56) References Cited

U.S. PATENT DOCUMENTS

| | | | | |
|---|---|---|---|---|
| 242,161 A | * | 5/1881 | Scuri .......................... 280/205 |
| 734,109 A | * | 7/1903 | Tolcher ...................... 280/205 |
| 3,145,797 A | * | 8/1964 | Taylor ........................ 180/209 |
| 3,399,742 A | * | 9/1968 | Malick ........................ 180/21 |
| 3,682,509 A | * | 8/1972 | Worley .................... 297/195.1 |
| 3,907,051 A | * | 9/1975 | Weant et al. ............... 180/907 |
| 4,155,590 A | * | 5/1979 | Cunningham .......... 297/215.15 |

(Continued)

*Primary Examiner*—Hau Phan
(74) *Attorney, Agent, or Firm*—Bromberg & Sunstein LLP

(57) ABSTRACT

A device for transporting a human subject over a surface. The device is a dynamically balancing vehicle having a control loop for providing balance. The device includes a platform defining a fore-aft plane. The platform supports a payload including the human subject. A ground contacting module is included which may include one or more wheels. A ground-contacting member is movably coupled to the platform. The platform and the ground-contacting module form an assembly having a center of gravity that is defined with respect to the ground-contacting member and which includes any loads on the device. The device further includes a support. The support may be a seat for supporting the subject and the support is coupled to the platform in such a manner as to permit variation of the position of the center of gravity in the fore-aft plane by translation and rotation of at least a portion of the support. In one embodiment, translation and rotation of the seat of the device are mechanically coupled together.

23 Claims, 17 Drawing Sheets

U.S. PATENT DOCUMENTS

| | | | | |
|---|---|---|---|---|
| 4,241,931 A | * | 12/1980 | Healy | 280/205 |
| 4,757,868 A | * | 7/1988 | Cresswell | 180/210 |
| 4,909,525 A | * | 3/1990 | Flowers | 180/908 |
| 4,944,360 A | * | 7/1990 | Sturges | 180/210 |
| 5,020,624 A | * | 6/1991 | Nesterick et al. | 180/210 |
| 5,366,036 A | * | 11/1994 | Perry | 180/65.1 |
| 5,701,965 A | * | 12/1997 | Kamen et al. | 180/65.8 |
| 6,443,250 B1 | * | 9/2002 | Kamen et al. | 180/8.1 |
| 6,561,294 B1 | * | 5/2003 | Kamen et al. | 180/21 |
| 6,615,938 B2 | * | 9/2003 | Morrell et al. | 180/8.2 |

* cited by examiner

FORE ⟷ AFT

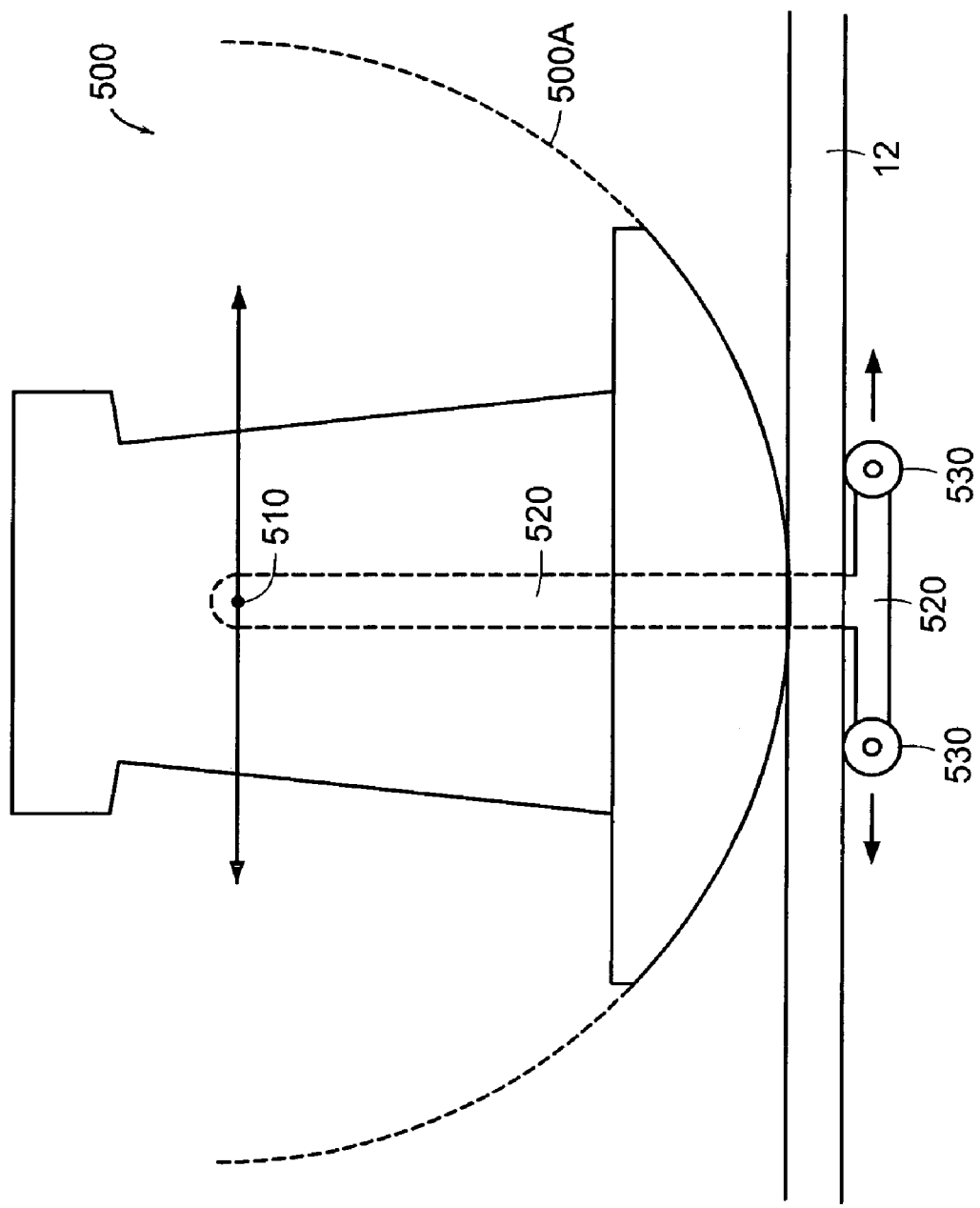

FORE ⟷ AFT

DYNAMIC BALANCING VEHICLE WITH A SEAT

CROSS REFERENCE TO RELATED APPLICATIONS

This application is a divisional of U.S. patent application 10/436,889, filed May 13, 2003, which has issued as U.S. Pat. No. 7,004,271 and is a U.S. continuation-in-part patent application of U.S. patent application Ser. No. 09/386,686 which was filed on Aug. 31, 1999 and is now U.S. Pat. No. 6,561,294. This application claims priority from both of these documents and they are both incorporated herein by reference in their entirety.

TECHNICAL FIELD AND BACKGROUND ART

The present invention relates to personal vehicles that have assisted balancing. In prior art systems, such as the self balancing vehicles shown in U.S. Pat. No. 5,871,091 personal vehicles may be self-propelled and user-guidable, and, further, may entail stabilization in one or both of the fore-aft or left-right planes, such as when no more than two wheels are in ground contact at a time. Vehicles of this sort may be operated in a mode in which motion of the vehicle, including acceleration (both linear and turning), is controlled partially or entirely by leaning of the vehicle as caused by a subject riding the vehicle. Several such vehicles are described in U.S. application Ser. No. 08/384,705 which is incorporated herein by reference.

Such balancing vehicles may lack static stability. Referring, for example, to FIG. 1A, wherein a prior art personal transporter is shown and designated generally by numeral 18, a subject 10 stands on a support platform 12 and holds a grip 14 on a handle 16 attached to the platform 12, so that the vehicle 18 of this embodiment may be operated in a manner analogous to a scooter. A control loop may be provided so that leaning of the subject results in the application of torque to wheel 20 about axle 22 thereby causing an acceleration of the vehicle. Vehicle 18, however, is statically unstable, and, absent operation of the control loop to maintain dynamic stability, subject 10 will no longer be supported in a standing position and will fall from platform 12. Another prior art balancing vehicle is shown in FIG. 1B and designated generally by numeral 24. Personal vehicle 24 shares the characteristics of vehicle 18 of FIG. 1A, namely a support platform 12 for supporting subject 10 and grip 14 on handle 16 attached to platform 12, so that the vehicle 24 of this embodiment may also be operated in a manner analogous to a scooter. FIG. 1B shows that while vehicle 24 may have clusters 26 each having a plurality of wheels 28, vehicle 24 remains statically unstable and, absent operation of a control loop to maintain dynamic stability, subject 10 will no longer be supported in a standing position and may fall from platform 12.

A standing rider 10 of the vehicle 30 places his feet on the platform and shifts weight back and forth in a relatively wide and flat path 33. The slight amount of strength that is needed to resist gravity and inertia in transversing this arc is well within the strength and coordination of an average user's muscles. The center of gravity of the vehicle and rider 35 moves in an arcuate fashion as the rider leans either forward or backward. When a seat is added to such a vehicle, movement of the center of gravity in the manner described above may no longer be possible and an alternative mechanism for shifting the center of gravity is required. The mechanism needs to provide adequate range of motion while allowing the rider to resist gravity and inertia.

SUMMARY OF THE INVENTION

A device for transporting a human subject over a surface is disclosed. The device is a dynamically balancing vehicle having a control loop for providing balance. The device includes a platform defining a fore-aft plane. The platform supports a payload including the human subject. A ground contacting module is included which may be one or more wheels. The ground-contacting member is movably coupled to the platform. The device and any load on the device has a center of gravity that is defined with respect to the ground-contacting member. The device further includes a support. The support may be a seat for supporting the subject and the support is coupled to the platform in such a manner as to permit variation of the position of the center of gravity in the fore-aft plane by translation and rotation of at least a portion of the support. The translation and rotation of at least a portion of the support are mechanically coupled in one embodiment.

The transportation device further includes a drive which is coupled to the ground-contacting module and which delivers power to the ground-contacting module in a manner responsive to the position of the center of gravity. The drive supplies force so as to balance the vehicle. In one embodiment, the support rotates about a virtual pivot point which lies above the support. The structure of the support allows the support to rock about an arc or other path.

The support may include a mechanical linkage such as a four bar linkage. In one embodiment, each bar of the four bar linkage is coupled together with pivots. A fifth bar may be included for holding a seat. The fifth bar is attached at one of the pivots of the four bar linkage. In another embodiment, the fifth bar is attached to one of the bars of the linkage. In one embodiment, the four bar linkage forms a parallelogram and changes shape as a user of the vehicle moves on the seat shifting the center of gravity.

In one embodiment, the device includes pressure sensors for activating the drive and causing the control loop to become active. The pressure sensors may be placed in the platform for activation or the pressure sensors may be placed in the seat. In yet another variant, a mechanical contact is attached to the support which contacts the pressure sensors that are coupled to the platform.

In another embodiment of the invention, the support includes a seat that is slideably mounted. The support includes one or more rails for allowing the seat to slide. The seat need not be capable of rotation in such an embodiment, but does allow for the user to change the center of gravity for controlling the vehicle. In another variation of the sliding seat, the sliding seat does rotate. As the seat slides along the rails a mechanism causes the seat to rotate. In one embodiment, the rails include one or more sprockets that engage with protrusions that are coupled to the seat and thus cause rotation as the seat is rolled on the rails. In another embodiment, the support may include one or more pulleys that assist the seat in sliding along the one or more rails. In yet another embodiment, the seat is coupled to friction wheels that ride on a friction surface.

In one embodiment, the support includes a convex radial base that allows the support to rock in response to a user shifting his weight. The convex radial base may be coupled to the platform at a pivot point that translates fore and aft with the motion of the seat. In other embodiments, the convex radial base may have different radii of curvature along its convex surface.

In certain embodiments, the support may include a damper such as a spring to return the support to a predetermined position. In one embodiment, the support preferably returns to a position, such that the vehicle remains substantially stationary when no force is applied to the support. In such an embodiment, the vehicle may still move slightly as the control loop balances the vehicle.

It should be recognized that a controller is either coupled to the drive or part of the drive and the controller is part of a control loop which is responsive to changes in the center of gravity. In certain embodiments, the seat may be coupled to the platform by a universal pivot. In another embodiment, the seat is coupled to a control stalk.

BRIEF DESCRIPTION OF THE DRAWINGS

The foregoing features of the invention will be more readily understood by reference to the following detailed description, taken with reference to the accompanying drawings, in which:

FIG. 6C shows the support structure coupled to the platform about a pivot point;

DETAILED DESCRIPTION OF SPECIFIC EMBODIMENTS

Figure 1A:
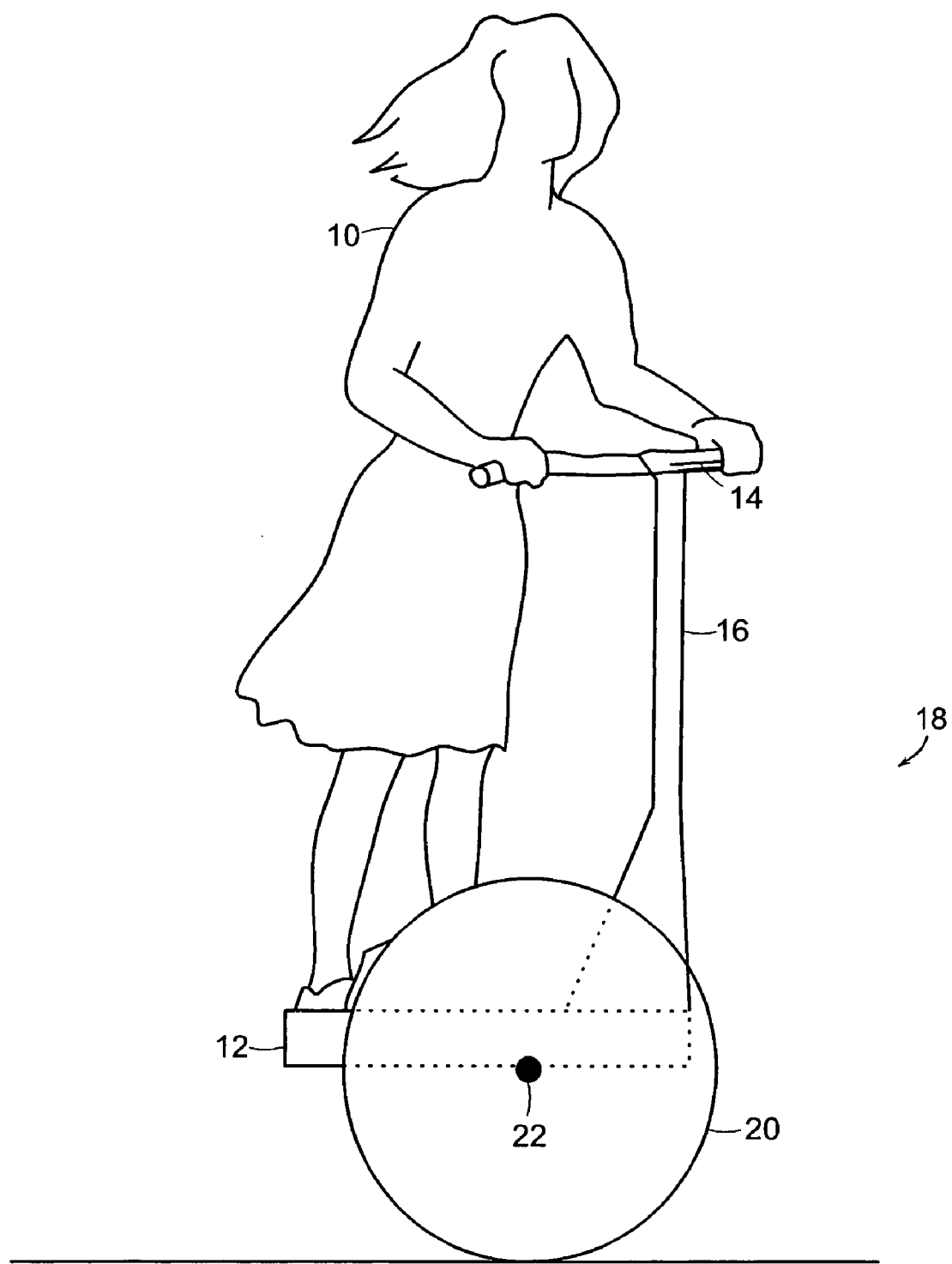
FIG. 1A is a side view of a prior art dynamically balancing vehicle of the type of which an embodiment of the invention may be advantageously employed.
Figure 1B:
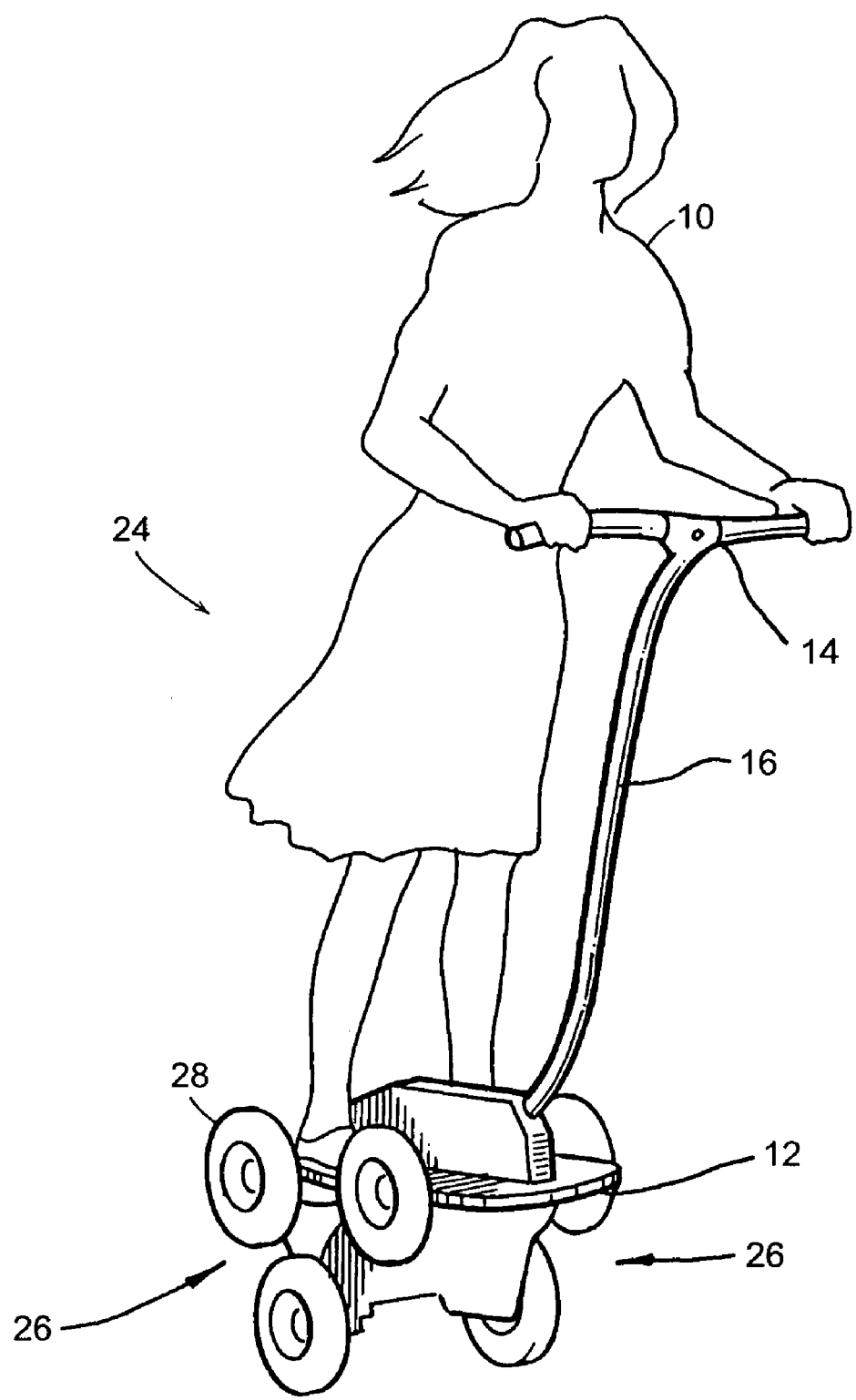
FIG. 1B is a side view of a further prior art dynamically balancing vehicle of the type of which an embodiment of the invention may be advantageously employed.
Figure 2A:
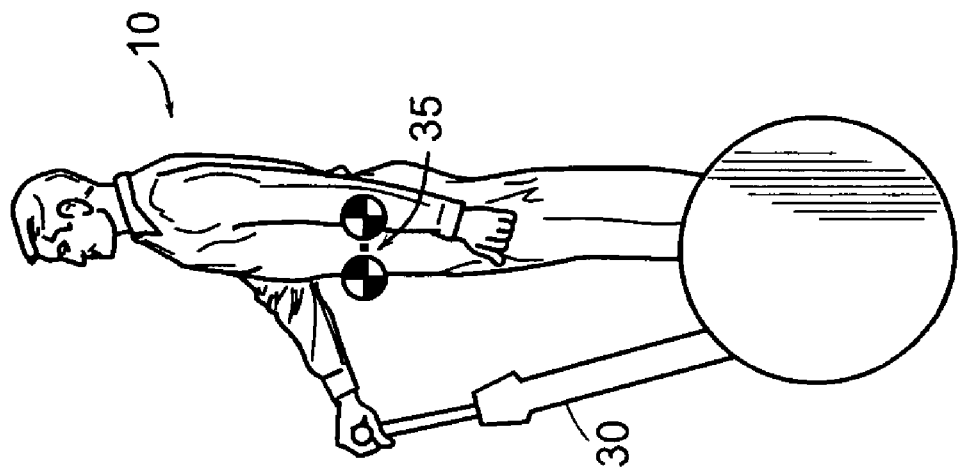
FIG. 2 is a prior art dynamically balancing vehicle having a platform that rotates in an arc.
Figure 2B:
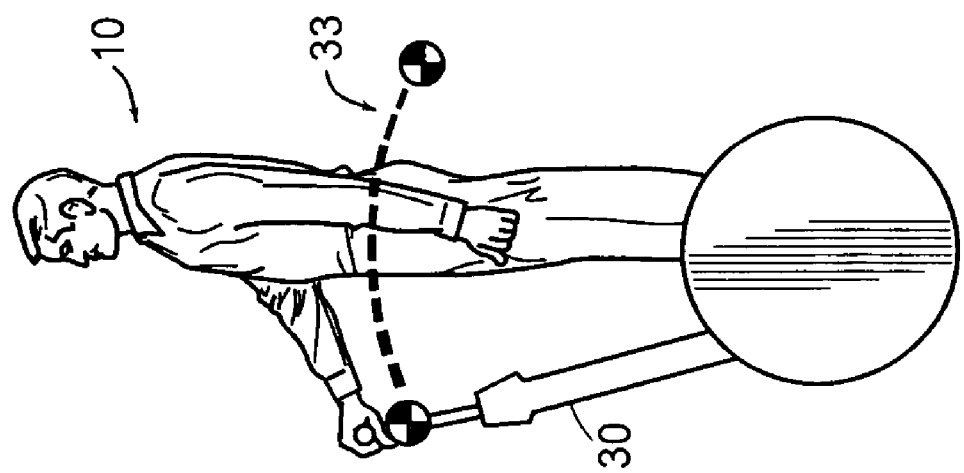
Figure 3:
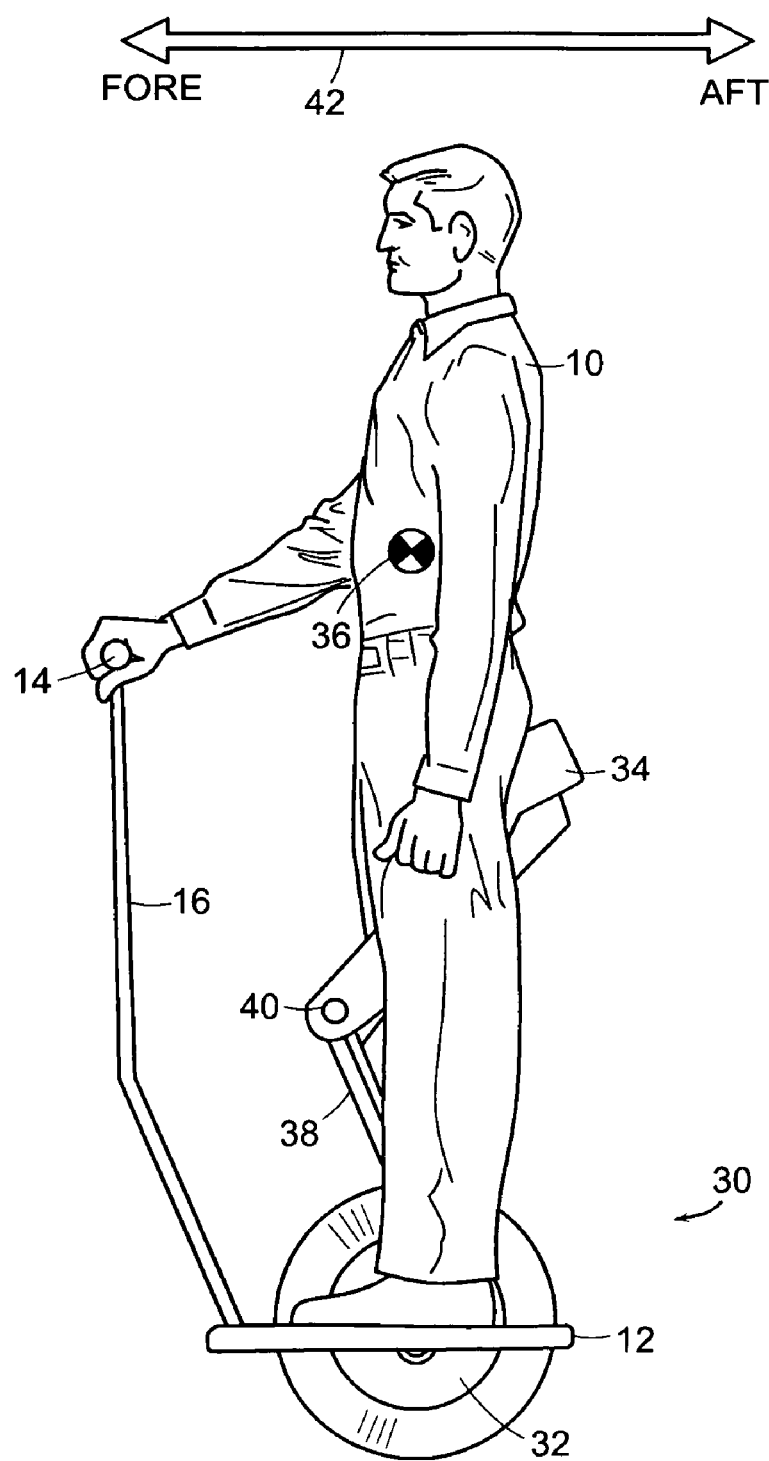
FIG. 3 shows a dynamically balancing vehicle having a seat.

A balancing vehicle is shown in FIG. 3. The balancing vehicle includes a ground-contacting module 32 which, in the embodiment that is shown, is a pair of co-axial wheels powered by motors. A controller is coupled to the motor for providing a control signal in response to changes in the center of gravity of an assembly that includes the vehicle along with a rider. As the rider 10 mounts the vehicle, the controller module senses the change in the center of gravity 36 and controls power to the wheels 32 based upon changes to the center of gravity 36 about a fore-aft plane 42 using a control loop. As the center of gravity 36 moves forward in the fore direction, power is provided to the wheels and the vehicle will move forward. As the center of gravity moves in the aft direction in response to the movement of the rider, the vehicle will slow and reverse direction such that the vehicle moves in the aft direction. As a change in the center of gravity is sensed, torque is applied to one or more the wheels (or other ground contacting members) of the vehicle by operation of the control loop and a wheel actuator (not shown). The pitch of the vehicle may also be sensed and compensated for in the control loop. The control module includes gyroscopes for sensing changes in the position of the center of gravity. The vehicle that is shown includes a platform 12 for supporting the rider and a control stalk 14 and 16. Appropriate force transducers may be provided to sense leftward and rightward leaning and related controls provided to cause left and right turning as a result of the sensed leaning. The leaning may also be detected using proximity sensors. Similarly, the vehicle of this embodiment may be equipped with a foot- (or force-) actuated switch located on the platform 12 to activate the vehicle, in such a manner that the switch is closed so as to power the vehicle automatically when the subject contacts the platform 12. This embodiment further includes a support 34, 38, 40 for the rider; the support may include a seat 34 on which the rider can rest.

Figure 3A:
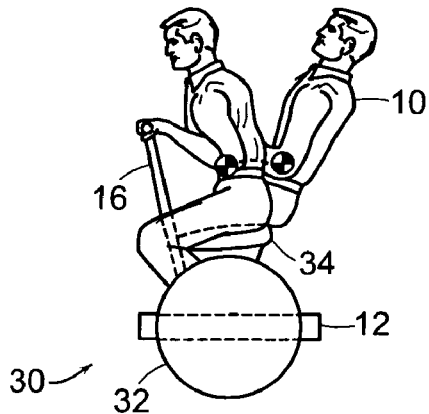
FIG. 3A shows a dynamically balancing vehicle in which the seat is coupled to a control stalk.
Figure 3B:
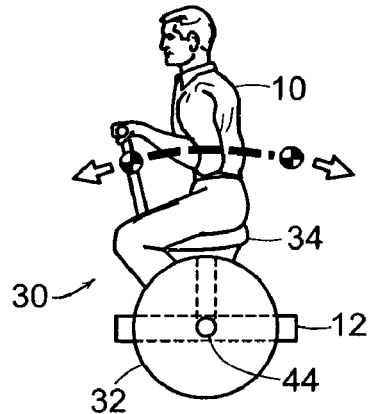
FIG. 3B shows a dynamically balancing vehicle in which the seat is coupled to the platform by a pivot.

In a first embodiment, the seat 34 is attached to the control stalk 16 as shown in FIG. 3A. The rider 10 then uses his body and momentum to move the center of gravity of the combination of the vehicle and the rider in either a forward or in an aft direction. In another embodiment, the seat 34 is attached to the platform 12 via a pivot point 44 as shown in FIG. 3B. The pivot may be a simple pivot such that the pivot moves only in the fore and aft directions or the pivot may be a universal pivot so that the seat may pivot in any direction. One example of a universal pivot is a spring. Further, the pivot may be mounted to the platform along the axis of the wheels, or the pivot may be mounted at other locations such as along the rear edge of the platform.

Figure 3C:
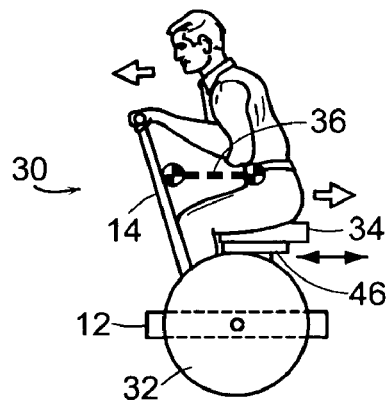
FIG. 3C shows a dynamically balancing vehicle in which the seat is slideably mounted.
Figure 3D:
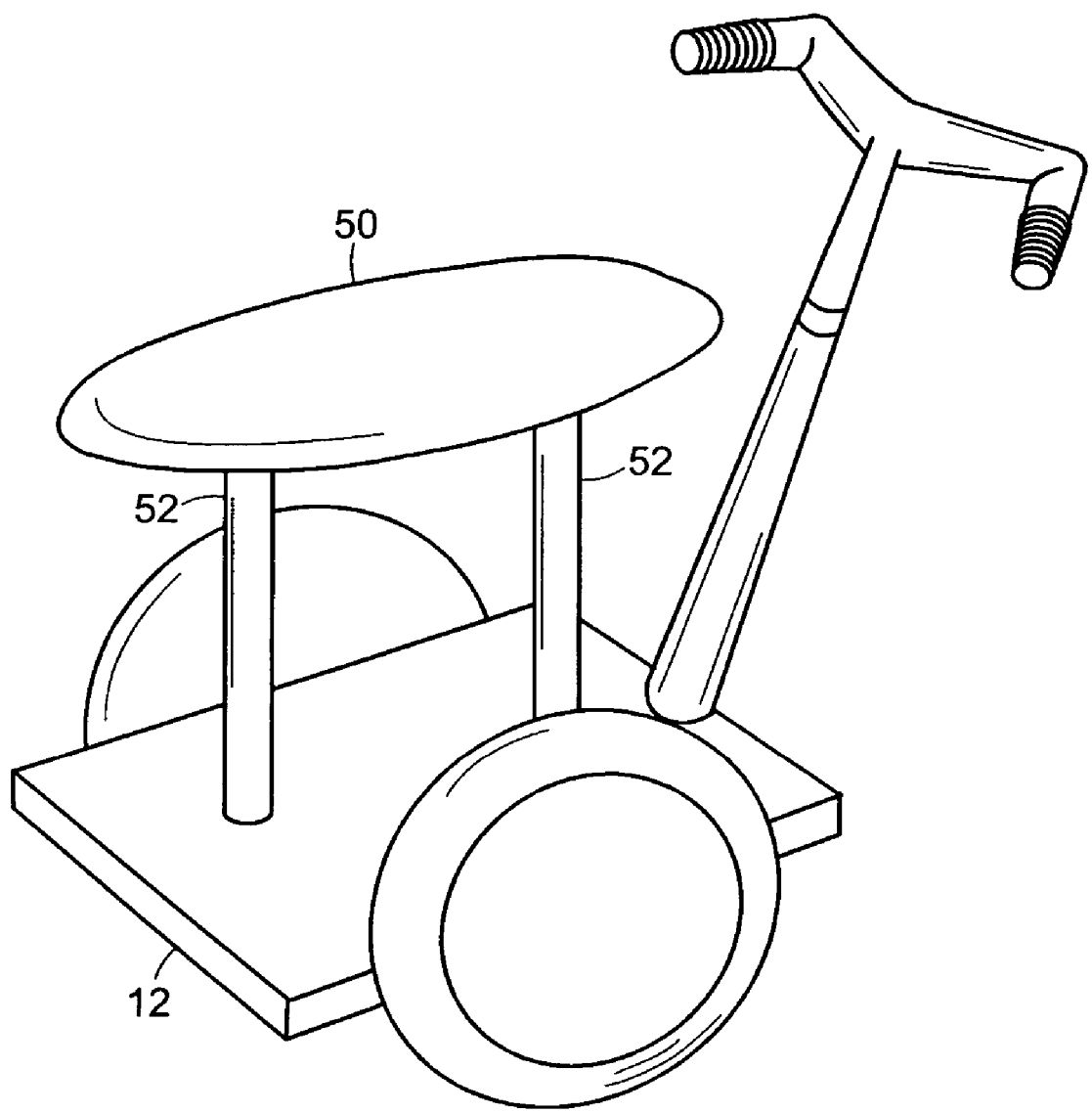
FIG. 3D shows a dynamically balancing vehicle having a seat.

In yet another embodiment, a seat is attached to the platform using one or more rails 46 on which the seat 34 slides as shown in FIG. 3C. In such an embodiment, the movement of the seat 34 by the rider causes a change in the position of the center of gravity of the vehicle and its load. If the seat is moved in the fore direction sensors sense the resulting tilt of the vehicle and cause the vehicle to increase in speed in the fore direction. If the seat is slid in the aft direction, the vehicle 30 will slow down correspondingly. In certain embodiments of the invention, a centering mechanism, such as, a spring may be incorporated with either the pivot or sliding seat, so the seat will return to a position such that the vehicle is substantially stationary when a rider disengages from the vehicle. In another embodiment, as shown in FIG. 3D, a seat 50 is mounted to the platform 12. The seat and the linkage 52 to the platform does not include a pivot. The seat in this embodiment preferably extends the length of the platform. When a rider engages the vehicle and sits on the seat, the rider may adjust the center of gravity by sliding her body along the length of the seat.

Figure 4C:
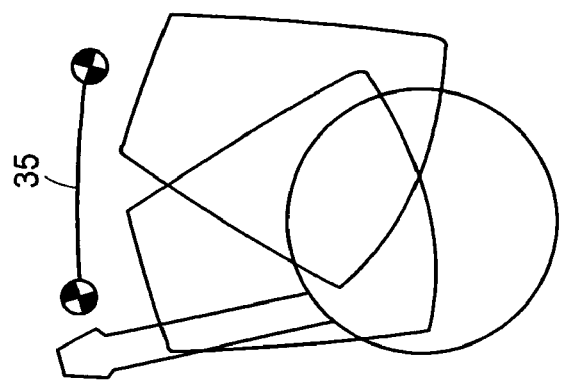
FIG. 4C shows that the four bar linkage simulates a rocking motion such that there is translation and rotation of the seat.
Figure 4B:
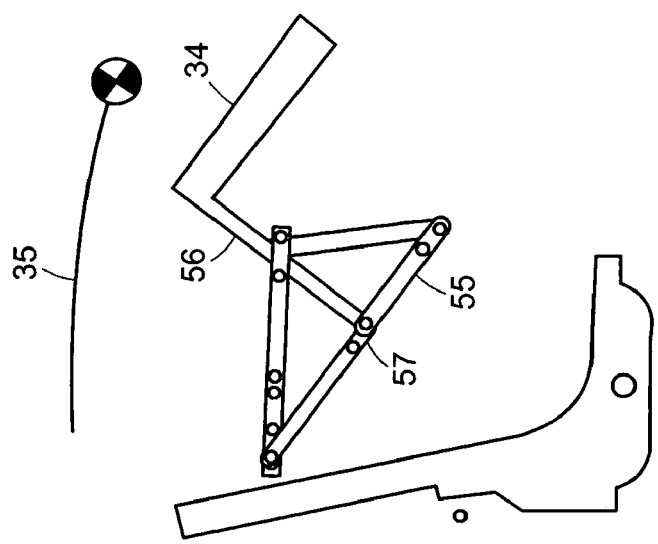
FIG. 4B shows one position of the four bar linkage as would occur if a rider leaned backwards shifting the center of gravity in the aft direction.
Figure 4A:
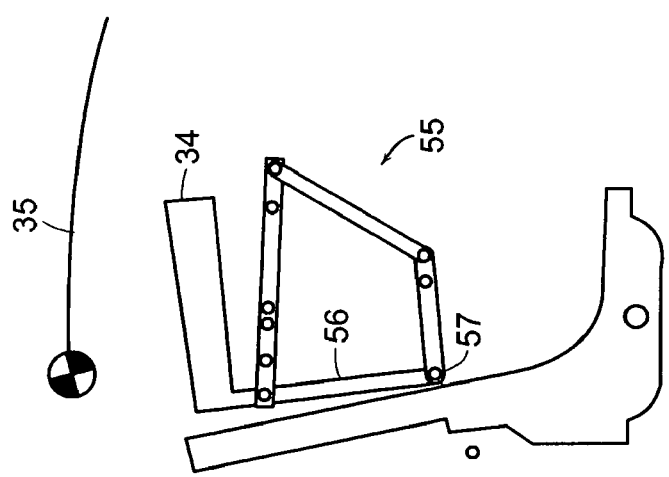
FIG. 4A shows the seat of the dynamically balancing vehicle mounted on a four bar linkage.
Figure 4D:
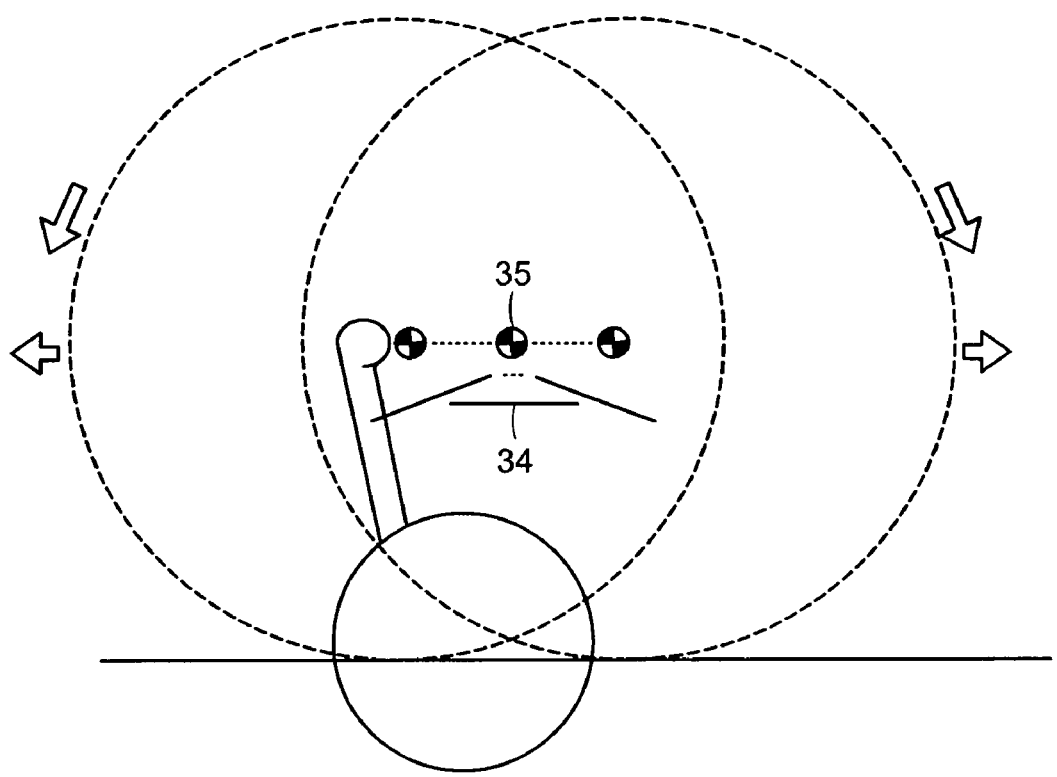
FIG. 4D shows the center of gravity translating in a straight line while the seat both translates and rotates.

In a further embodiment, the vehicle includes a bar linkage mechanism, such as a four bar linkage, that is attached to the control stalk as shown in FIG. 4A. The four bar linkage mechanism is also attached to a seat by another bar (seat post) which is coupled to the four bar linkage about a common pivot point of the four bar linkage or coupled to a bar in the linkage. The four bar linkage mechanism allows the seat to move in an arc which simulates a rocking motion similar to that of a rocking chair about the base platform as shown in FIG. 4C. FIG. 4B shows one position of the four bar linkage 55 as would occur if a rider leaned backwards shifting the center of gravity in the aft direction. The rider both moves in the aft direction and also rotates in the aft direction and as such both, translation and rotation are coupled together. Viewed in another way, the four bar linkage allows the seat to move in an arc about a virtual pivot point. The virtual pivot point can be located at a point above the seat. In other embodiments, the virtual pivot point may be located below the seat. As the seat 34 both translates and rotates the center of gravity 35 moves in a straight line in the fore-aft plane as shown in FIG. 4D. In other embodiments, the center of gravity need not move in a straight line and the position of the center of gravity may vary. The motion of the seat creates a rider experience that is different from the seats discussed above in FIGS. 3A-3D. In this embodiment, there is no position that the seat automatically returns to. As such, there are no peaks or wells in terms of the amount of energy that is required to move the center of gravity. In this embodiment, no arm force is required to maintain a position of the center of gravity relative to the wheel axis as is the case with simple and universal pivots as shown in FIGS. 3A-3C. This allows both ease of pitch control and the ability of the rider to find the center of gravity position above the axle of the vehicle so that the vehicle is substantially stationary. The virtual pivot mechanism allows the seated rider, to have a similar experience on the dynamically balancing vehicle that a standing rider would have.

In the version of the vehicle described with respect to FIGS. 4A-4E, the control stalk is held by the rider by a pair of hand grips that extend from the control stalk. As a rider sits on the seat, the seat can move about the fore-aft plane and the seat will both shift and rotate when the rider moves, thus changing the center of gravity.

Although the embodiment, shown above has a linkage mechanism for providing the coupling of rotation and translation, other structures and systems could also be designed to provide this functionality such as those shown in, but not limited to FIGS. 5A-E and FIGS. 6, 6A, 6B, and 6C and the present invention is not intended to be limited to mechanical linkages.

Figure 4E:
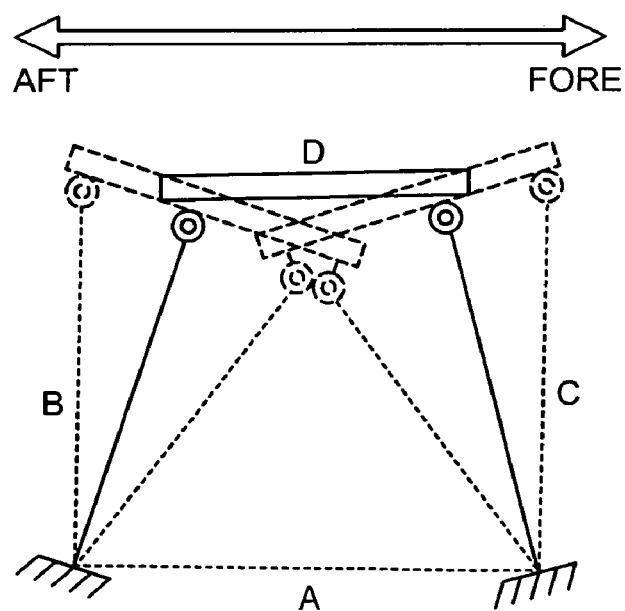
FIG. 4E shows a bar linkage mechanism for translation and rotation wherein one or more bars are flexible.

In a further embodiment, the four bar linkage includes non-rigid members that can flex. For example, FIG. 4E shows a support structure where members B and C each flex and member D is rigid as are the couplings of members B and C to platform A. In this embodiment members B and C are shown such that the two members lean inwards to meet member D. As force is placed on the seat through member D by the rider in the fore-aft direction, the members B and C will flex such that the seat will move in a rocking motion about a virtual pivot point that lies above the seat. The motion of members B and C is shown in FIG. 4E by the dotted lines. As such, member D which supports the seat will both translate and rotate. Further, pivots may be included in such an embodiment, so that the linkage both pivots and flexes. For instance, pivots may be placed at the point where member D comes into contact with members B and C as shown in the figure. In still another variation, members B and C may be positioned so rather than leaning inward, the two members are outward leaning. In this type of embodiment, the seat will move much like a rocking chair. If a rider leans in the fore direction the seat will translate in the fore direction and the seat will rotate such that the fore-most part of the seat will be lower than the aft-most part of the seat. This is different from the embodiment that is shown in FIG. 4E wherein if a rider causes the seat to translate in the fore direction, the seat will rotate such that the fore-most part of the seat is elevated as compared to the aft-most part of the seat.

Figure 5A:
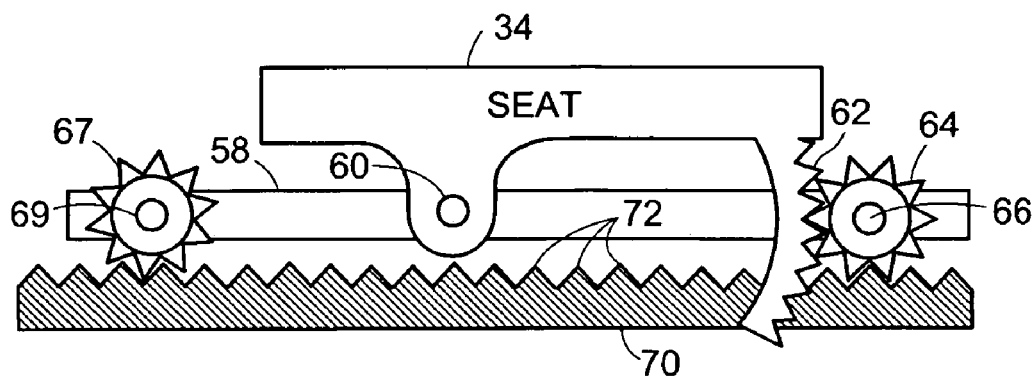
FIG. 5A is an embodiment of the dynamically balancing vehicle in which the seat is attached to a bar via a pivot.

FIGS. 5A-5E each show different embodiments in which both translation and rotation are coupled. In FIG. 5A the seat 34 is attached to a bar 58 via a pivot 60. The seat further includes a series of protrusions 62 formed in an arc which mesh with a sprocket 64. The sprocket 64 is attached to the bar 58 and can spin about an axis 66. The bar includes a second sprocket 67 which can rotate about a central axis 69. The sprockets 64, 67 each reside on a strip/track 70 that includes protrusions 72 that mesh with the sprockets 64, 67. As a user of the vehicle moves the seat in a fore or aft direction the seat will translate and rotate due to the protrusions 62 that are formed in an arc and which are coupled to the seat. In other embodiments, the track on which the seat slides may have a different profile. For example, the track may be convex, concave, or have a varying profile along its length. If the track has a varying profile, the rider needs to apply more force to move the seat along certain portions of the track. Thus, different track profiles may be employed in order to shape the path of the center of gravity and the center of gravity need not move in a straight line.

Figure 5B:
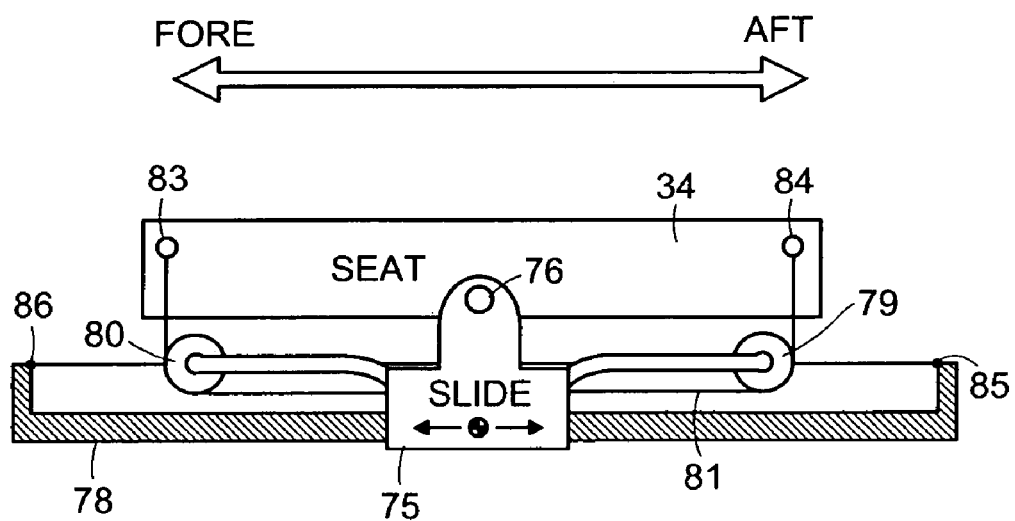
FIG. 5B is an embodiment that shows the seat attached to a slider about a pivot point wherein pulleys help to control rotation.

In FIG. 5B the seat 34 attaches to a slider 75 about a pivot point 76. The slider fits on a rail 78 and the slider 75 can slide on the rail 78. Attached to the slider at the seat are at least two pulleys 79, 80. The pulleys 79, 80 are positioned toward opposite ends of the seat about the slider. One or more wires or cables 81 are attached to the seat and a fixed portion of the vehicle such as the rail. The cables 81 engage the pulleys 80, 79. As the seat is slid by the rider in the forward or aft direction, the pulleys cause the seat to tilt due to changing tension in the cables. The cables are coupled to either end of the rail 85, 86 or some other component of the vehicle and also to the seat at opposite ends 83, 84. In the embodiment as shown, there are two separate cables, one of which runs from rail end 86 across pulley 79 and attaches to the seat at 84. The second cable attaches to the seat at 83 and across pulley 80 and attaches at the rail end 85. If the seat is moved in the aft direction, the edge of the seat in the aft direction will be rotated and lowered. Similarly, if the seat is moved by the rider in the fore direction, the fore-most part of the seat will rotate and will be lowered.

Figure 5C:
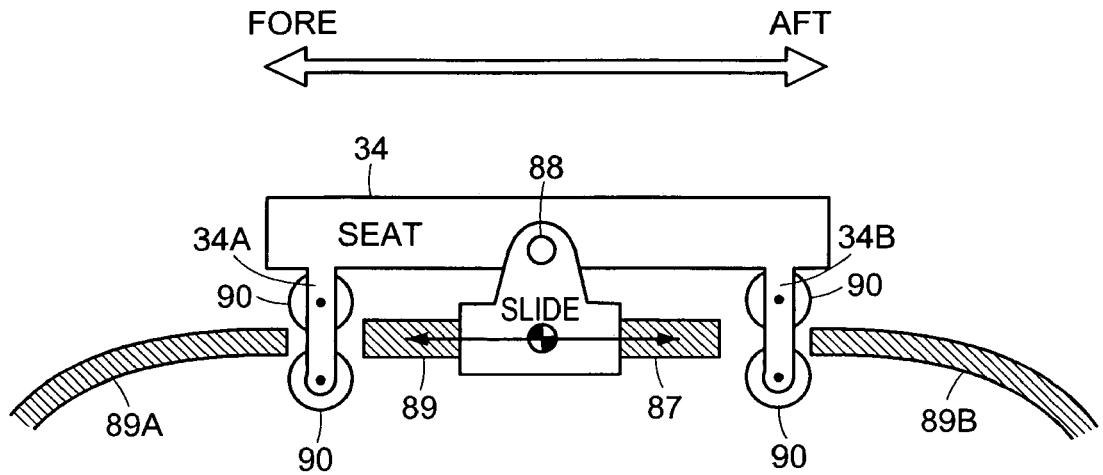
FIG. 5C shows a seat that is coupled to a slider that rides on at least partially curved rails.

In FIG. 5C, the seat is coupled to a slider 87 about a pivot point 88. The slider 87 is seated on a rail 89 and provides for the seat to be slid in a fore and an aft direction. The seat also includes two extensions 34A, 34B that each have two wheels 90 mounted thereto. Between each pair of wheels is a straight track which includes an arc 89A, 89B at each end of the track. As the seat is slid in either the fore or the aft direction the wheels roll along the arc and cause the seat to tilt about the pivot point. It can be imagined that the track has a varying curvature, such that the center portion of the track is itself curved and that the ends have a greater radius of curvature as compared to the center.

Figure 5D:
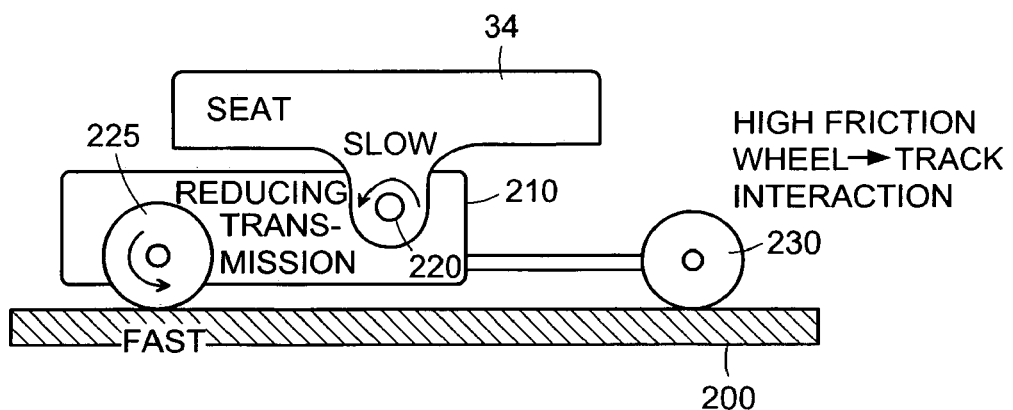
FIG. 5D shows a seat coupled to a track which includes friction wheels wherein the seat both translates and rotates.

In FIG. 5D, the seat 34 rides on a track 200. The seat 34 is coupled to a transmission 210 by a pivot 220. The transmission is coupled to a pair of friction wheels 225, 230. In this embodiment, translation of the seat 34 is directly coupled to rotation of the seat. As the seat is moved by the rider and the friction wheels rotate along the track the seat will also rotate. In the embodiment that is shown, the wheels rotate a greater amount than the pivot rotates the seat. The transmission therefore, causes the seat to pivot/rotate at a fraction of the rotation of the friction wheels. It should be understood that all of the tracks that are shown in FIGS. 5A-5D may be the same length as the platform or may extend beyond the length of the platform in the fore-aft direction or may be shorter than the length of the platform. The support structure also will include a mechanism for holding the track at a proper seat height. For example, the track may be mounted to the control stalk, or may sit on its own mounting structure that is coupled to the platform. For example, the mounting structure may be a shaft.

Figure 6:
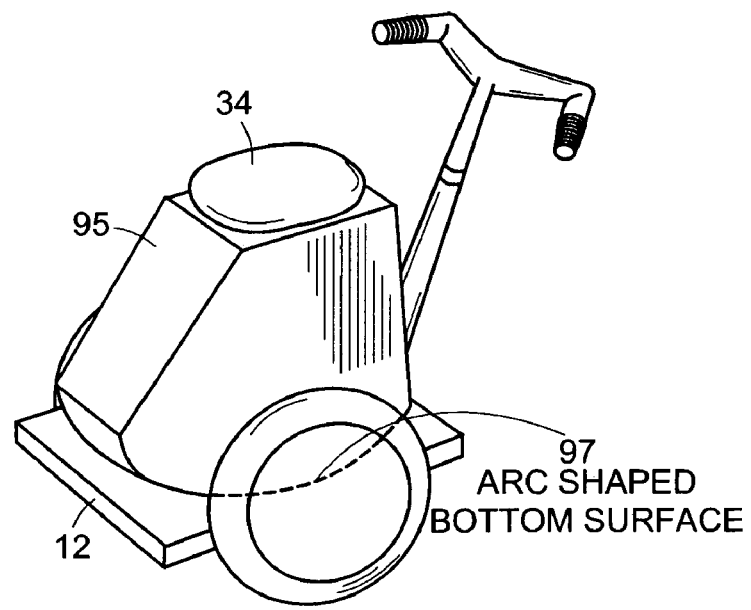
FIG. 6 shows a side view of an embodiment of the dynamically balancing vehicle with a detachable rocker seat.

FIG. 6 shows a side view of an embodiment of the dynamically balancing vehicle with a detachable rocker seat. The rocker seat includes a support structure 95. The bottom portion of the support structure contacts the platform and is shaped like an arc 97 allowing the seat 34 to rock. The arc shaped lower member 97 of the support structure 95 is coupled to the platform 12 via a moving contact point. The arc shaped member 97 member rotates equally in the fore and aft plane in this embodiment. Although in other embodiments, rotation may be limited in either the fore or aft direction. The support structure may also be coupled to the platform via a pair of rails. In this embodiment, the support structure rests on the rails that the rails include a mechanism that constrains the support structure from moving in any other plane other than the fore-aft plane. In such an embodiment, the arch shaped lower portion of the support structure is not coupled to the platform at a contact point. In such an embodiment, the arc shaped member may roll on a series of rails or wheels. In another embodiment, the support structure may include a guide pin that extends through the support structure and is enclosed by the rails on either side of the support structure. In such an embodiment, the seat can rock in the fore-aft direction about a virtual pivot that is above the seat. It should be understood that a virtual pivot point need not be above the seat, in certain embodiments, the virtual pivot point may exist below the seat, for example.

It should be recognized, that the lower surface of the support structure that is formed in an arc may have any number of radii. For example, the lower surface may have a greater curvature at the edges and less of a curvature at its center, so that as the support structure rocks about its central portion, each unit of translation there is proportional to a degree of rotation, but as the support structure is rocked further toward the edges, there is a greater degree of rotation for each unit of translation.

Figure 5E:
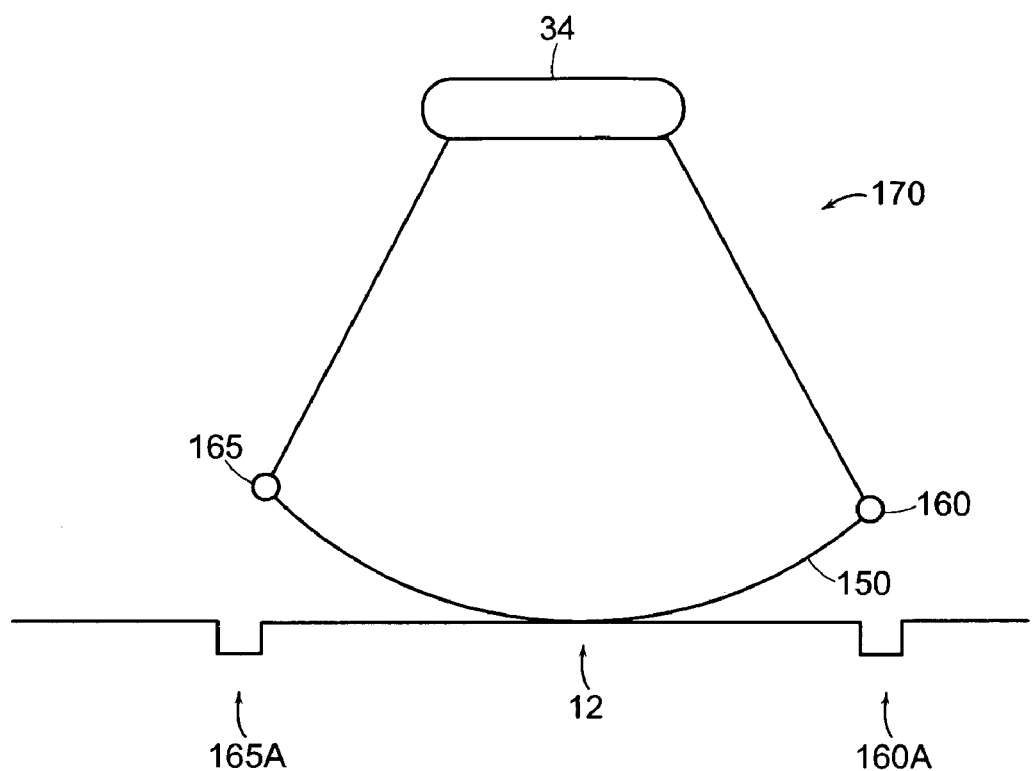
FIG. 5E shows a support structure having a plurality of pins which will engage with recesses in the platform.

In another version, the lower surface of the support structure 150 includes two pins 160, 165 at the edges of the arc as shown in FIG. 5E. As the support structure rocks 170 to the edge, one of the pins 160 or 165 will engage with a recess 160A or 165A in the platform 12. If the rider continues to lean in the same direction, the support structure will rotate about the pin 160 or 165. Thus, there are two different ratios of translation to rotation for this embodiment. As the support structure 170 rocks about the arc there is less rotation for each unit of translation as compared to motion about the pin 160 or 165 in which there is rotation without translation when the pin engages with the recess of the platform.

The embodiment of FIG. 6, in which the support structure has an arc as the lower surface, may be coupled to the platform in any one of a number of ways. For example, gravity may hold the support structure on the platform 12.

Figure 6A:
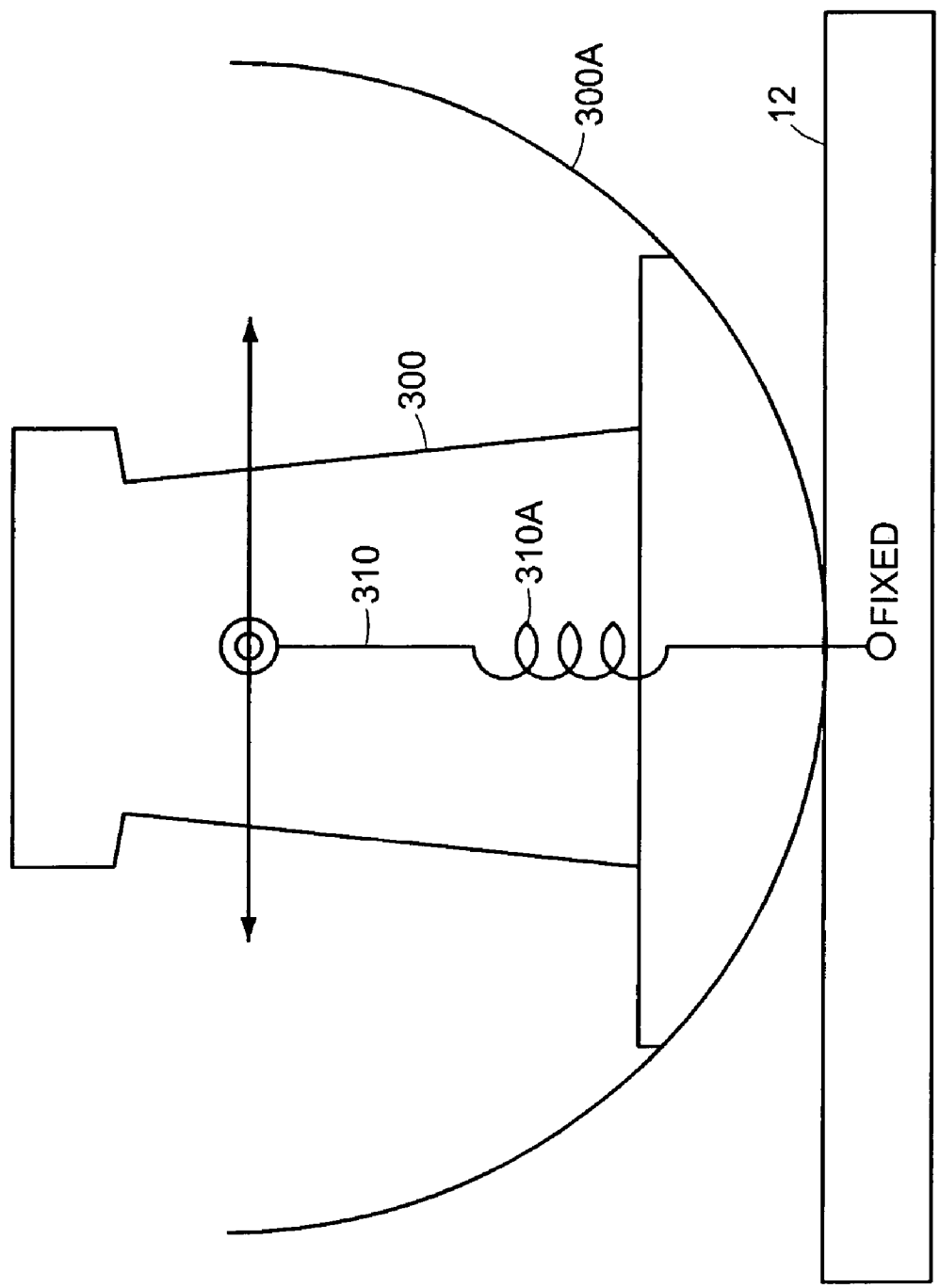
FIG. 6A shows the support structure attached to the platform via a simple cable under tension.
Figure 6B:
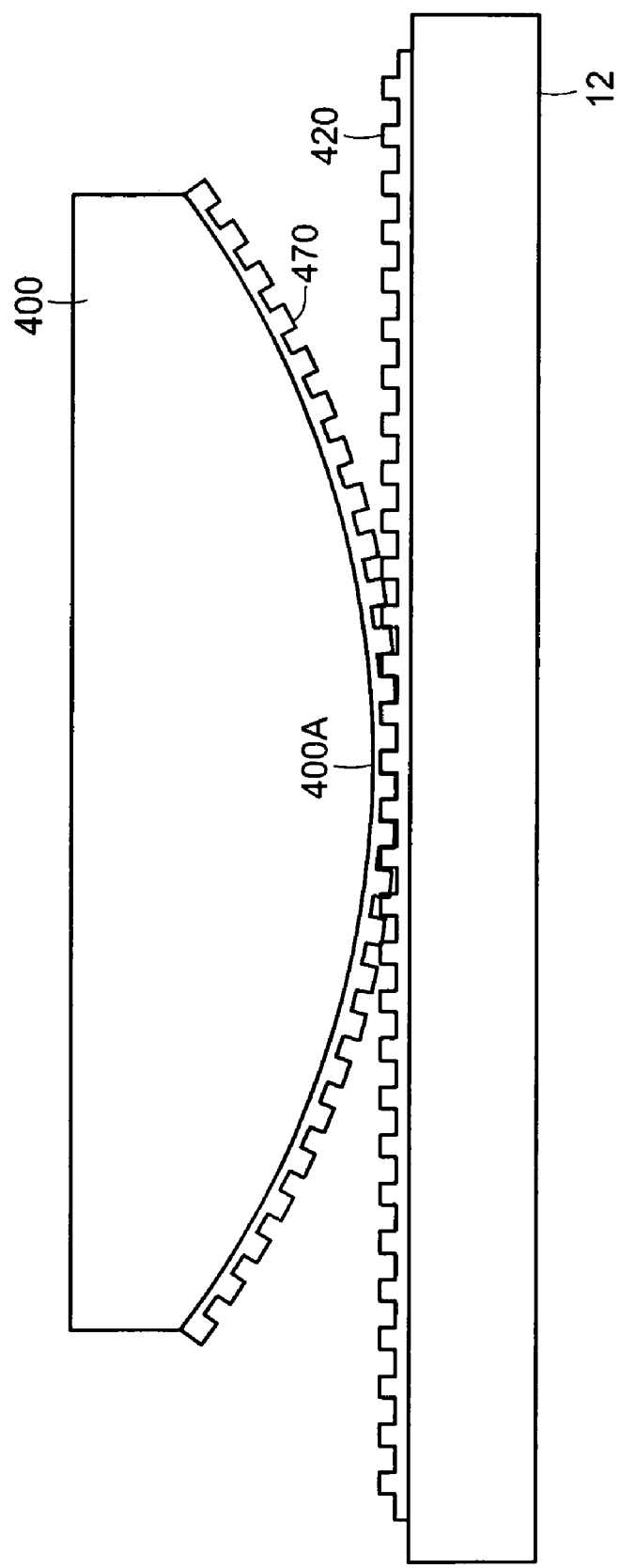
FIG. 6B shows the support structure including a series of teeth on the bottom arced surface and also on the platform.

Further, the platform surface and the bottom surface of the support structure may be formed from materials having a high coefficient of friction. In another embodiment, as shown in FIG. 6A, the support structure 300 may be attached to the platform 12 via a simple cable 310 under tension (including a spring 310A). In this embodiment, as the support structure rocks about the arc of the bottom surface 300A, the spring 310A stretches, and thus there is a restoring force returning the support structure 300 to a centered position as shown. As shown in FIG. 6B, the support structure 400 may include a series of teeth 410 on the bottom arced surface 400A and the platform 12 may include a series of mating teeth 420 for the bottom surface. As the support structure rocks the teeth of the bottom surface and of the platform interlock. In FIG. 6C, the support structure 500 is coupled to the platform 12 about a pivot point 510. The pivot 510 is coupled to a member 520 which extends down through the platform and which in this embodiment, rides on a pair of wheels 530. In this embodiment, the member 520 is rigid. As force is applied to the support structure 500 by the rider in the fore-aft directions, the support structure 500 will translate and the wheels 530 will rotate on the bottom side of the platform as shown. The support structure 500 will also rotate about the pivot point 510 due to the arched bottom side of the support structure 500A. In this embodiment, the support structure 500 will maintain contact with the platform at all times, including over rough terrain. Again, it should be recognized, that other mechanisms for coupling the support structure to the platform can be envisioned and the present invention should not be limited by the embodiments that are shown.

In one embodiment, the platform of the vehicle includes one or more pressure sensors to sense the rider either engaging or disengaging from the vehicle. When the rider powers-up the vehicle and engages the vehicle, the vehicles enters a balancing mode. A control loop is made operational that senses changes to the position of the center of gravity and that causes the vehicle to move with respect to the changes. If the vehicle includes a seat, the rider may not engage the pressure sensors because her feet may not make contact with the platform or the rider may remove her feet from the platform. In order to overcome this problem, sensors, such as pressure sensors, may be included in the seat. In another embodiment, a mechanical device such as a link or tube may be employed to make contact with the platform when the rider engages the vehicle.

Figure 7A:
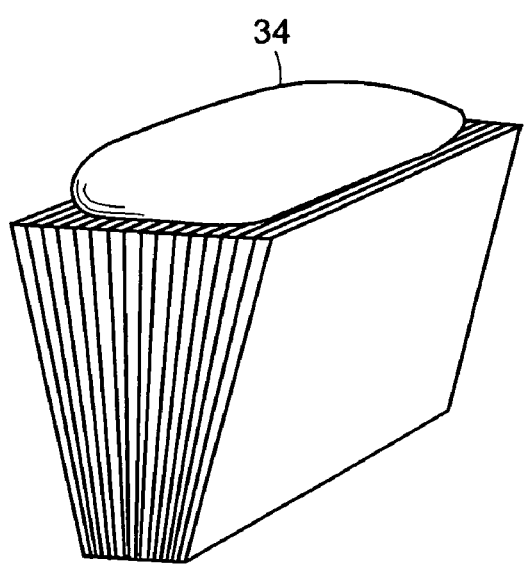
FIG. 7A shows a folding seat which can be attached to a dynamically balancing vehicle wherein the seat is positioned as if a rider is sitting on the seat.
Figure 7C:
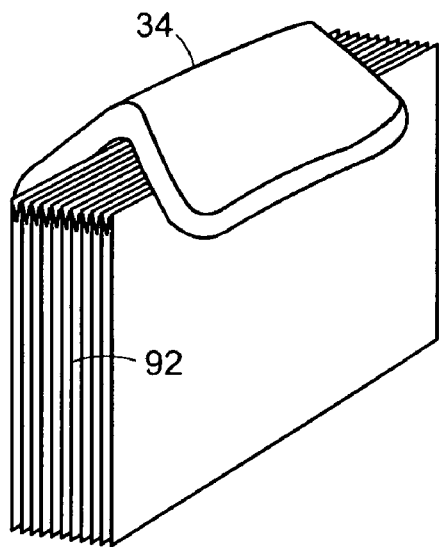
FIG. 7C shows the position of the folding seat when a rider engages/disengages with the vehicle.
Figure 7B:
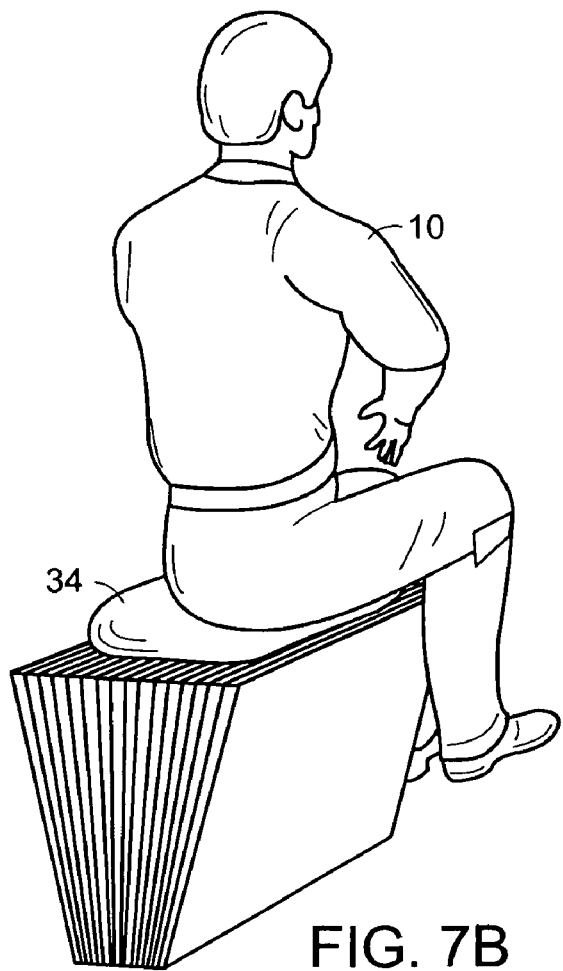
FIG. 7B shows a rider sitting on the folding seat.

The support structure may be designed to either fold or compress in order to allow for the rider to better engage/disengage with the vehicle and also for shock absorption. For example FIGS. 7A-C shows a folding seat which may be employed with the previously described vehicles. In FIG. 7A the seat is in full view and is positioned as if a rider is sitting on the seat. The sides of the seat expand in an outward direction like an accordion when weight is put on the seat. FIG. 7B shows a rider sitting on the seat. FIG. 7C shows the position of the seat when a rider 10 engages/disengages with the vehicle. If the rider is already on the vehicle, the seat 34 rises up and folds as the rider stands and the support structure 92 contracts inwardly reducing the size of the support.

The support structure for the seat may also include a mechanism for allowing lateral movement in a plane substantially perpendicular to the fore-aft plane of the vehicle. The vehicle may include sensors to sense the lateral movement. The sensors can be tied into a control loop so that if a rider leans to the right more power is applied to the left wheel allowing the vehicle to turn to the right. In other embodiments of the support structure, lateral movement may not be tied to sensors and a control loop, but may simply perform the function of allowing the rider to readily shift his or her weight of over rough terrain.

Figure 7D:
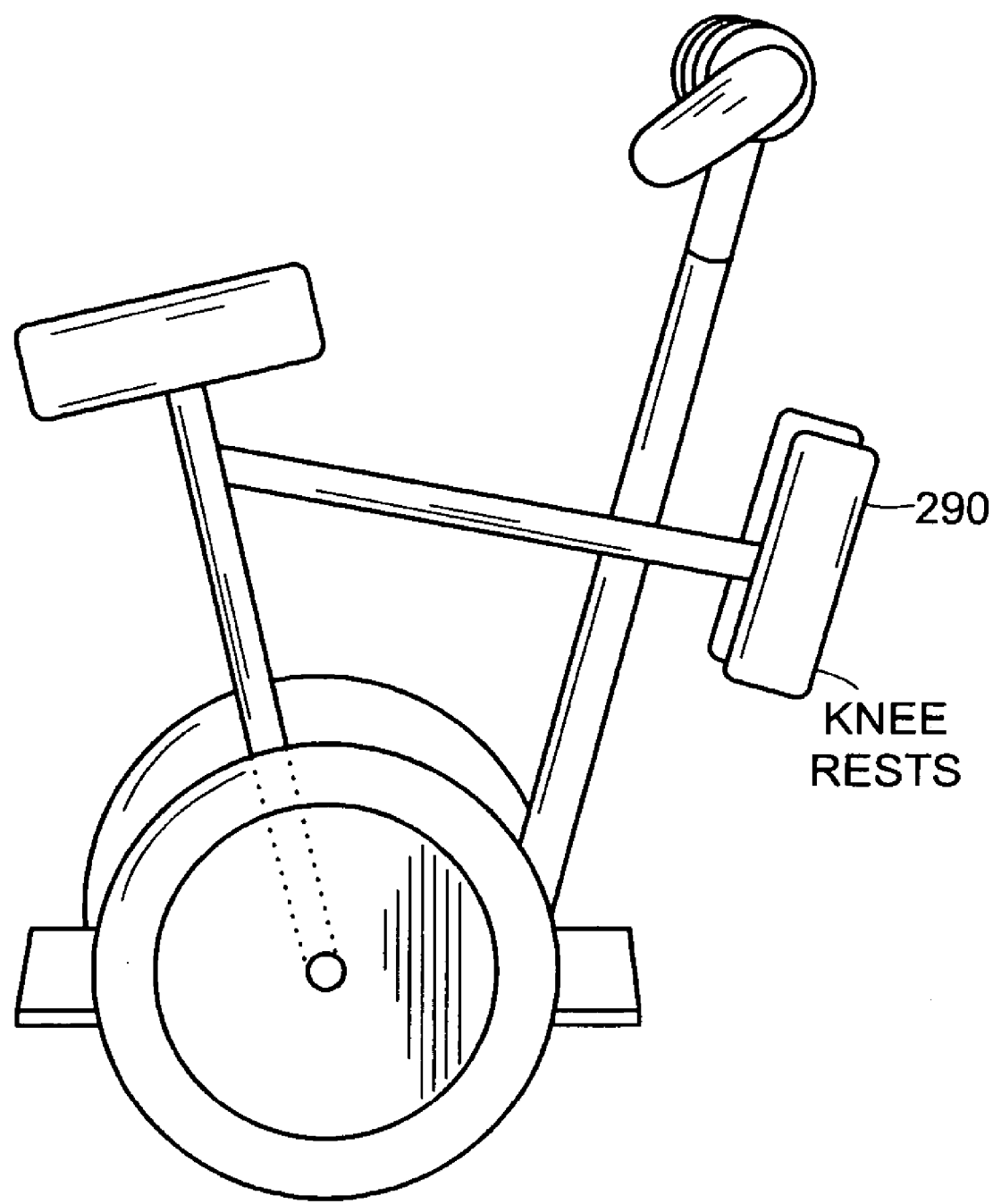
FIG. 7D shows an embodiment of a dynamically balancing vehicle having knee supports.

The support structure may also include knee rests 290 as shown in FIG. 7D to allow more consistent rider coupling to the vehicle and to provide postural advantage and/or partial body support.

Figure 8:
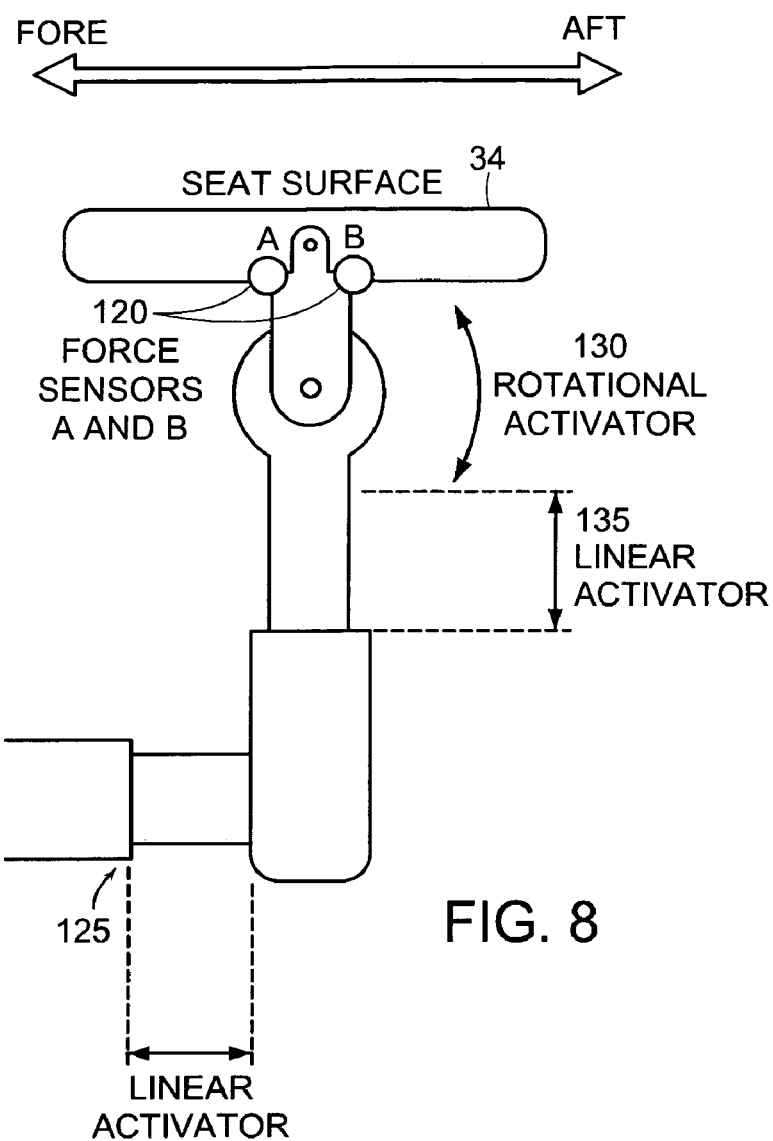
FIG. 8 shows an embodiment of a support structure which includes both translational and rotational mechanical actuators.
Figure 8A:
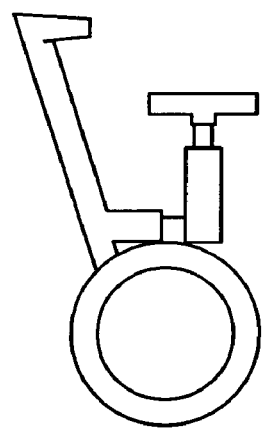

FIG. 8 shows another embodiment, in which the seat 34 both translates and rotates. It is preferable that translation and rotation are coupled. In this embodiment, there are force sensors 120 in the seat. As a rider shifts his weight on the seat 34, the force sensors 120 sense the change. Based upon the changes in force, both a linear actuator 125 and a rotational actuator 130 are engaged. If the rider shifts his weight such that more weight is provided to force sensor A than to B, the linear actuator 125 will cause translation of the seat in the fore direction. Additionally, the seat will be rotated in the fore direction by the rotational actuator 130, such that the fore-most part of the seat will be lowered and the aft-most part of the seat will be raised. The embodiment as shown also includes a linear actuator 135 that provides linear motion in the vertical direction. This actuator 135 makes engagement and disengagement with the vehicle easier. In this embodiment, both translation and rotation are controlled by mechanical actuators. Using mechanical actuators for providing translation and rotation of the seat, assists individuals having a reduced strength capacity when compared to the simpler mechanical designs that require the rider to manually shift the position of the seat, to significantly shift their weight using their own strength, and to maintain a position of either leaning in the fore or in the aft direction using their muscle strength.

The described embodiments of the invention are intended to be merely exemplary and numerous variations and modifications will be apparent to those skilled in the art. All such variations and modifications are intended to be within the scope of the present invention as defined in the appended claims.

What is claimed is:

1. A device for transporting a human subject over a surface, the device comprising:
    a platform defining a fore-aft plane, the platform supporting a payload including the human subject;
    a ground contacting module, including a ground-contacting member movably coupled to the platform, the device including the payload having a center of gravity, the center of gravity having a position defined with respect to the ground-contacting member;
    a support for supporting the subject, the support coupled to the platform to permit variation of the position of the center of gravity in the fore-aft plane by translation and rotation of the support; and a drive, coupled to the ground-contacting module, for delivering power to the ground-contacting module responsive to the position of the center of gravity.

2. The device according to claim 1, wherein the support rotates about a virtual pivot point above the support.

3. The device according to claim 2, wherein the seat is slideably mounted.

4. The device according to claim 2, wherein the support includes one or more rails and rotation of the seat occurs when the seat slides along the rails.

5. The device according to claim 4, wherein the rails include one or more sprockets that engage with protrusions coupled to a seat for rotating the seat.

6. The device according to claim 4, wherein the support includes one or more wheels that allow the support to slide along the rails.

7. The device according to claim 1, wherein the support includes a mechanical linkage.

8. The device according to claim 7, wherein the mechanical linkage is a pivotally coupled bar linkage.

9. The device according to claim 1, further comprising:
a pressure sensor coupled to the platform for sensing a subject and activating the drive.

10. The device according to claim 9, further comprising:
a mechanical contact for contacting the pressure sensors coupled to the platform when a subject is supported by the support.

11. The device according to claim 1, wherein the support includes a seat.

12. The device according to claim 1, wherein the drive supplies force so as to balance the vehicle.

13. The device according to claim 1, wherein the support includes a convex radial base which couples to the platform.

14. The device according to claim 1, wherein the support includes a convex radial base is coupled to the platform at a movable contact point.

15. The device according to claim 1, further comprising:
a damper for damping movement of the support.

16. The device according to claim 15, wherein the damper causes the support to return to a pre-determined position relative to the platform.

17. The device according to claim 16, wherein the pre-determined position causes the device to return to a stable position.

18. The device according to claim 1, wherein rotation and translation of the seat are mechanically coupled together.

19. The device according to claim 1, wherein the support includes a convex bottom for contacting the platform, wherein the convex bottom has a plurality of radii of curvature.

20. A transportation device, the transportation device having an associated center of gravity, the device comprising:
a platform;
a motor;
a ground contacting module coupled to the motor for propelling the transportation device;
a control module coupled to the motor for providing a control signal to the motor that is based at least in part on the center of gravity of the device and any load on the device; and
a support for supporting a user, at least a portion of the support being capable of translating and rotating with respect to the platform.

21. The device according to claim 20, wherein the control module provides a signal to the motor that is based at least on the center of gravity of the device including any load on the device.

22. The device according to claim 20, wherein the support includes a seat, wherein if a user of the device causes the seat to translate the seat will also rotate.

23. The device according to claim 20, wherein the support has a convex surface which allows the support to rock.

* * * * *